US010109163B2

(12) United States Patent
Li et al.

(10) Patent No.: US 10,109,163 B2
(45) Date of Patent: Oct. 23, 2018

(54) TACTILE VIBRATION CONTROL SYSTEM AND METHOD FOR SMART TERMINAL

(71) Applicant: Goertek Inc., Wei fang (CN)

(72) Inventors: Bo Li, Wei fang (CN); Yongqiang Feng, Wei fang (CN); Shasha Lou, Wei fang (CN)

(73) Assignee: GOERTEK INC., Weifang, Shandong (CN)

( * ) Notice: Subject to any disclaimer, the term of this patent is extended or adjusted under 35 U.S.C. 154(b) by 44 days.

(21) Appl. No.: 15/324,151

(22) PCT Filed: Jun. 23, 2016

(86) PCT No.: PCT/CN2016/086932
§ 371 (c)(1),
(2) Date: Jan. 5, 2017

(87) PCT Pub. No.: WO2017/113652
PCT Pub. Date: Jul. 6, 2017

(65) Prior Publication Data
US 2018/0182212 A1    Jun. 28, 2018

(30) Foreign Application Priority Data

Dec. 31, 2015 (CN) .......................... 2015 1 1031603

(51) Int. Cl.
*G06F 3/01* (2006.01)
*G08B 6/00* (2006.01)
*G05D 19/02* (2006.01)

(52) U.S. Cl.
CPC .............. *G08B 6/00* (2013.01); *G05D 19/02* (2013.01); *G06F 3/01* (2013.01)

(58) Field of Classification Search
CPC ..................................................... G08B 6/00
(Continued)

(56) References Cited

U.S. PATENT DOCUMENTS 5,388,992 A * 2/1995 Franklin ................. G06F 3/016
340/407.1
5,610,848 A * 3/1997 Fowell ..................... B64G 1/24
708/300

(Continued)

FOREIGN PATENT DOCUMENTS

CN        1378898 A    11/2002
CN      103793050 A     5/2014

(Continued)

OTHER PUBLICATIONS

P. Niu et al. "Process Control System" Electronic Industry Press, pp. 298-302, Jun. 30, 2011.

(Continued)

*Primary Examiner* — Santiago Garcia
(74) *Attorney, Agent, or Firm* — Buchanan Ingersoll & Rooney PC

(57) ABSTRACT

A tactile vibration control system and method for a smart terminal. The system includes a command generator, a filter, a tactile driver and a linear resonant actuator; the command generator generates an initial commanding signal according to an input signal; the filter filters the initial commanding signal so that amplitudes of a predetermined number of initial pulses of the filtered commanding signal are larger than a set threshold and phases of a predetermined number of ending pulses reverse; and the tactile driver generates a driving signal according to the filtered commanding signal for driving the actuator to vibrate. The initial commanding signal generated by the command generator is filtered so that when the actuator is driven to vibrate by the driving signal generated subsequently, the actuator has a quick starting response and a quick braking response.

15 Claims, 4 Drawing Sheets

(58) Field of Classification Search
USPC .......................................................... 340/6.1
See application file for complete search history.

(56) References Cited

U.S. PATENT DOCUMENTS

| | | | |
|---|---|---|---|
| 6,850,151 B1 | 2/2005 | Calhoun et al. | |
| 7,346,172 B1 | 3/2008 | Begault | |
| 9,552,066 B2* | 1/2017 | Taninaka | B06B 1/0246 |
| 9,606,628 B2* | 3/2017 | Taninaka | G06F 3/016 |
| 9,918,154 B2* | 3/2018 | Timothy | H04R 1/1016 |
| 2002/0051332 A1* | 5/2002 | Miyajima | H02P 25/032 |
| | | | 361/187 |
| 2006/0119573 A1* | 6/2006 | Grant | B06B 1/0215 |
| | | | 345/156 |
| 2006/0139840 A1* | 6/2006 | Yasuda | F16F 13/26 |
| | | | 361/143 |
| 2007/0092087 A1 | 4/2007 | Bothra et al. | |
| 2013/0106589 A1* | 5/2013 | Posamentier | G06F 3/016 |
| | | | 340/407.1 |
| 2013/0106756 A1* | 5/2013 | Kono | G06F 1/3215 |
| | | | 345/173 |
| 2013/0165226 A1* | 6/2013 | Thorner | G06F 3/011 |
| | | | 463/37 |
| 2014/0028547 A1 | 1/2014 | Bromley et al. | |
| 2014/0118216 A1 | 5/2014 | Garg et al. | |
| 2015/0332565 A1* | 11/2015 | Cho | G08B 6/00 |
| | | | 310/317 |
| 2016/0234588 A1* | 8/2016 | Timothy | H04R 1/1008 |
| 2016/0300388 A1* | 10/2016 | Stafford | A63F 13/211 |
| 2017/0034612 A1* | 2/2017 | Timothy | H04R 1/10 |
| 2017/0156662 A1* | 6/2017 | Goodall | A61B 5/4836 |
| 2017/0182517 A9* | 6/2017 | Houston | B06B 1/166 |
| 2017/0188129 A1 | 6/2017 | Sindia et al. | |

FOREIGN PATENT DOCUMENTS

| | | |
|---|---|---|
| CN | 104954566 A | 9/2015 |
| CN | 105027418 A | 11/2015 |
| CN | 204760039 U | 11/2015 |
| CN | 205485661 U | 8/2016 |
| CN | 205581671 U | 9/2016 |
| JP | H 10240354 A | 9/1998 |

OTHER PUBLICATIONS

Office Action (The First Office Action) dated May 22, 2017, by the State Intellectual Property Office of the People's Republic of China in the Chinese Patent Application No. 201511031780.7, and an English Translation of the Office Action. (16 pages).

Office Action (The First Office Action) dated May 27, 2017, by the State Intellectual Property Office of the People's Republic of China in corresponding Chinese Patent Application No. 201511031603.9, and an English Translation of the Office Action. (19 pages).

Written Opinion (PCT/ISA/237) dated Oct. 11, 2016, by the State Intellectual Property Office of the P.R.C. for International Application No. PCT/CN2016/090873.

Written Opinion (PCT/ISA/237) dated Sep. 21, 2016, by the State Intellectual Property Office of the P.R.C. for International Application No. PCT/CN2016/086931.

Notice of Allowance issued by the U.S. Patent and Trademark Office in the U.S. Appl. No. 15/312,435, dated Mar. 27, 2018, U.S. Patent and Trademark Office, Alexandria, VA. (26 pages).

* cited by examiner

TACTILE VIBRATION CONTROL SYSTEM AND METHOD FOR SMART TERMINAL

TECHNICAL FIELD

The present disclosure relates to the field of tactile feedback technology, and in particular, a tactile vibration control system and method for a smart terminal.

BACKGROUND

For years, there has been intensive exploration and utilization of reception channels for both visual and auditory information in the technical fields of communication and media. Even though tactile sensation has applications in technical fields like virtual reality and game special effects, etc., such as for applications in remote or indirect operation, simulation of shooting, explosion or the like sceneries by means of the vibration of joysticks, further development in tactile sensation information channel has not been started until recent years.

Linear resonant actuators are a kind of electromagnetic systems in which a weight is loaded on a spring. They have an inherent or natural resonant frequency and typically are high quality factor systems. Therefore when an electric driving input signal stops, the oscillation response of the system will not disappear immediately but progressively weaken. This kind of residual vibration will last for some time, and even affect the next vibration, so desired vibration cannot be achieved.

SUMMARY

Based on the above description, the embodiments of the present disclosure provide a tactile vibration control system and method for a smart terminal, so as to effectively constrain or eliminate the residual vibration of the linear resonant actuator.

In order to achieve the above objects, the technical solutions adopted by the embodiments of the present disclosure are as follows:

In one aspect, an embodiment of the present disclosure provides a tactile vibration control system for a smart terminal, comprising: a command generator, a filter, a tactile driver and a linear resonant actuator;

the command generator generates an initial commanding signal according to an input signal and sends the initial commanding signal to the filter;

the filter filters the received initial commanding signal and sends the filtered commanding signal to the tactile driver; amplitudes of a predetermined number of initial pulses of the filtered commanding signal are larger than a set threshold and phases of a predetermined number of ending pulses reverse;

the tactile driver generates a driving signal according to the received filtered commanding signal and sends the generated driving signal to the linear resonant actuator; and the linear resonant actuator receives said driving signal and is driven by the driving signal to vibrate.

In another aspect, an embodiment of the present disclosure provides a tactile vibration control method for a smart terminal, comprising:

generating an initial commanding signal according to an input signal;

filtering the initial commanding signal so that amplitudes of a predetermined number of initial pulses of the filtered commanding signal are larger than a set threshold and phases of a predetermined number of ending pulses reverse; and generating a driving signal according to the filtered commanding signal so that a linear resonant actuator is driven by the driving signal to vibrate.

The advantage of the embodiments of the present disclosure lies in that: with respect to the phenomenon of residual trailing occurring in the linear resonant actuator when the driving signal stops driving, the present disclosure controls the linear resonant actuator by adopting an open-loop control means; by setting a filter in the open-loop control, the filter is used to filter the initial commanding signal generated by the command generator so that when the linear resonant actuator is driven to vibrate by the driving signal generated subsequently there are a quick starting response and a quick braking response. It weakens the overlapping level of the successive vibration events with short gaps on the time dimension, enhances the differentiation between successive vibration events on the time dimension, effects quick starting and quick braking, and thus achieves a desired vibration effect.

In preferable embodiments, by setting a plurality of sensors that can monitor or sense the vibrating status of the linear resonant actuator, a feedback unit that fuses the sensing signals characterizing the physical quantities related to the vibration mode output by the plurality of sensors into a feedback signal, and a comparator that generates an error signal based on the feedback signal and a desired signal in the input signal, the present disclosure controls the physical quantities of the vibration of the linear resonant actuator in real time. It more robustly estimates the status of the linear resonant actuator and provides control by effective incorporation so as to further solve the phenomenon of residual trailing occurring when the linear resonant actuator vibrates. Meanwhile, the solution can achieve a technical effect of adjusting the vibrating status of the actuator in real time by feedback and adjustment in real time.

BRIEF DESCRIPTION OF THE DRAWINGS

The drawings are intended to provide further understanding of the present disclosure and constitute part of the description. The drawings explain the present disclosure in connection with the embodiments of the present disclosure but in no way limit the present disclosure. In the drawings.

DETAILED DESCRIPTION

To make the objects, technical solutions and advantages of the present disclosure more clear, the embodiments of the present disclosure will be described in further detail in connection with the drawings.

Tactile sensation, as an important body sensation model, has irreplaceable advantages over the senses of sight and hearing:

1. compared with visual and auditory organs, human skin has a much larger surface area and thus there are many optional locations for receiving information, such as finger tips, palms, and arms, etc.;

2. when it is not convenient to use the human visual and auditory organs, for example, when the visual and auditory organs are not available, skin can be used to receive information by means of stress or shock; and 3. information exchange via tactile channels is relatively concealed and thus of higher security.

With respect to the above advantages of tactile sensation, technology of force feedback and vibration feedback based on tactile sensation is progressively applied to the fields of consumer electronics and industrial control, and becomes an important constituent part of human-machine interaction interfaces widely used in hand-held appliances, wearing appliances, domestic appliances and industrial control devices.

An important function of tactile vibration systems is to send information. Different vibration modes represent different information, and thus it is required to precisely adjust the vibration frequency and vibration amplitude of the actuators. Eccentric rotating mass motors (ERM) and linear resonant actuators (LRA) are two types of typical actuators. The vibration frequency and vibration amplitude of the eccentric rotating mass motors cannot be controlled independently and will cause concomitant noise, while linear resonant actuators do not suffer from these problems and their time for starting and braking is shorter than eccentric rotating mass motors, and, therefore, are more widely used.

Linear resonant actuators are a kind of electromagnetic systems in which a weight is loaded on a spring. They have an inherent or natural resonant frequency and typically are high quality factor systems. Thus there will be a phenomenon of residual trailing occurring in the linear resonant actuators when the driving signal stops driving.

By analyzing the phenomenon of residual trailing occurring in the linear resonant actuators when the driving signal stops driving, the present disclosure finds that: the phenomenon of residual trailing is totally decided by the convolution of the driving signal and the impulse response of the linear resonant actuators. Thus the present disclosure changes, by processing the driving signal, the output following its convolution with the impulse response of the linear resonant actuators.

Embodiment I

Figure 1:
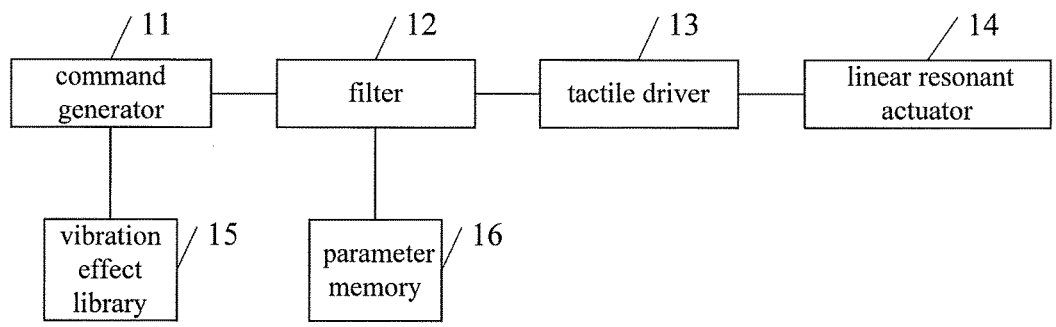
FIG. 1 is a block diagram of a tactile vibration control system for a smart terminal provided by Embodiment I of the present disclosure.

FIG. 1 is a block diagram of a tactile vibration control system for a smart terminal provided by this embodiment. The smart terminal of the present disclosure can be hand-held appliances, wearable appliances (such as smart watches and smart bracelets), and industrial control devices.

As shown in FIG. 1, the tactile vibration control system of FIG. 1 is an open-loop control system, comprising: a command generator 11, a filter 12, a tactile driver 13 and a linear resonant actuator 14.

As shown in FIG. 1, the output port of the command generator 11 is connected to the input port of the filter 12, the output port of the filter 12 is connected to the input port of the tactile driver 13, and the output port of the tactile driver 13 is connected to the input port of the linear resonant actuator 14.

The command generator 11 generates an initial commanding signal according to an input signal and sends the initial commanding signal to the filter 12. The input signal in this embodiment can be a desired signal characterizing the vibration mode of the linear resonant actuator and a selecting command, and can be media streaming data which can be audio streaming data or video streaming data.

As shown in FIG. 1, the command generator 11 in this embodiment is also connected to a vibration effect library 15. A vibration mode list in the vibration effect library 15 records sequence of physical quantities characterizing vibration effects to which different vibration modes of the linear resonant actuator corresponds.

When the input signal is a desired signal characterizing vibration mode of the linear resonant actuator and a selecting command, the command generator 11 reads the vibration mode list in the vibration effect library 15, and selects a corresponding sequence of physical quantities from the vibration mode list according to the selecting command in the input signal, the sequence of physical quantities being used as the initial commanding signal.

When the input signal is media streaming data, the command generator 11 acquires a physical signal characterizing vibration effects derived from the media streaming data from the media streaming data, the physical signal being used as the initial commanding signal.

The filter 12 filters the received initial commanding signal and sends the filtered commanding signal to the tactile driver 13; amplitudes of a predetermined number of initial pulses of the filtered commanding signal are larger than a set threshold and phases of a predetermined number of ending pulses reverse. The open-loop control solution provided by this embodiment requires the driving signal generated by the commanding signal which was processed by the filter to have an overdriving feature in the initial time period and have an initiative braking feature in the ending time period.

It should be noted that the filter 12 of FIG. 1 is preferably a post module of the command generator 11 and arranged between the command generator 11 and the tactile driver 13 so as to filter the initial command generated by the command generator 11. Of course, in practice, the filter 12 of this embodiment can also be a preposition module of the command generator 11, that is, the output of the filter 12 is connected to the input of the command generator 11, the filter 12 filtering the input signal so that the driving signal generated by the tactile driver 13 has an overdriving feature in the initial time period and has an initiative braking feature in the ending time period.

The parameters of the filter in this embodiment are decided by the impulse response of the linear resonant actuator. Preferably, the time domain signal of the filter is an impulse signal. As shown in FIG. 1, the tactile vibration control system of this embodiment is also provided with a parameter memory 16 connected to the filter 12. The parameter memory 16 at least stores inherent parameters for calculating the damped resonant period and the damping ratio of the linear resonant actuator so that the impulse moment and impulse amplitude of each impulse of the impulse signal can be calculated by means of the damped resonant period and the damping ratio calculated.

When designing the filter 12, the damped resonant period of the linear resonant actuator 14 can be calculated by the resonant frequency and the damping ratio of the linear resonant actuator 14; for example, the damped resonant period $T_d$ of the linear resonant actuator is calculated based on the formula $$T_d = \frac{1}{\sqrt{1-\zeta^2}\, f_n},$$

and then the impulse moment of each impulse of the impulse signal is determined by the damped resonant period $T_d$; and the impulse amplitude of each impulse is calculated by the damping ratio of the linear resonant actuator 14; for example, the impulse amplitude is calculated according to the formula $$A = \frac{1}{1+e^{\frac{-\zeta\pi}{\sqrt{1-\zeta^2}}}};$$

wherein, $f_n$ is the resonant frequency of the linear resonant actuator, and $\zeta$ is the damping ratio of the linear resonant actuator.

Assuming that the impulse signal comprises two impulses in this embodiment, the constraint conditions for the impulse moment and impulse amplitude of the impulse signal are: $t_1=0$, $A_1+A_2=1$, wherein $t_1$ and $t_2$ are the impulse moments of the first impulse and the second impulse respectively, and $A_1$ and $A_2$ are the impulse amplitudes of the first impulse and the second impulse respectively.

If the resonant frequency of the linear resonant actuator is $f_n=175$ Hz and the damping ratio $\zeta=0.028$, then in accordance with the above calculating formula for the damped resonant period of the linear resonant actuator, it can be calculated that the damped resonant period $T_d=5.8$ ms, then the impulse moment of the first impulse $t_1=0$, and the impulse amplitude $$A_1 = \frac{1}{1+e^{\frac{-\zeta\pi}{\sqrt{1-\zeta^2}}}} = 0.522;$$

and the impulse moment of the second impulse $t_2=1/2T_d=2.9$ ms, and the impulse amplitude $A_2=1-A_1=0.478$.

The tactile driver 13 generates a driving signal according to the received filtered commanding signal and sends the generated driving signal to the linear resonant actuator 14.

The linear resonant actuator 14 receives the driving signal and is driven by the driving signal to vibrate.

Of course, the tactile vibration control system in this embodiment also comprises a micro-controlling unit which is intended to control the signal transmission between the command generator 11, the filter 12, the tactile controller 13, the linear resonant actuator 14, the vibration effect library 15 and the parameter memory 16. That micro-controlling unit is used as the central controller of the tactile vibration control system.

Figure 2:
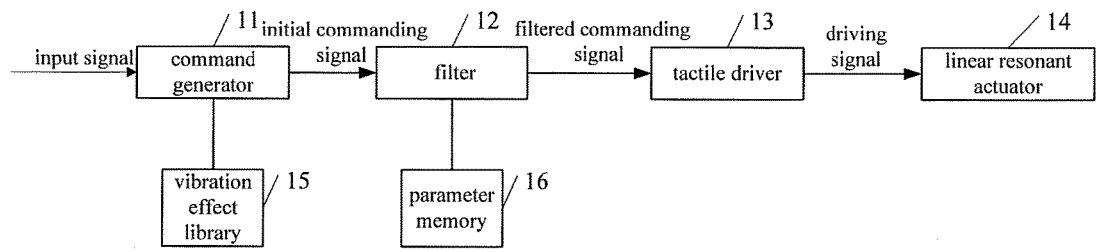
FIG. 2 shows a schematic view of the operation of the open-loop tactile vibration control system in FIG. 1.

The operation of the tactile vibration control system in this embodiment is shown in FIG. 2:

The micro-controlling unit in the smart terminal generates an input signal based on certain triggering events (such as the user pressing the touch screen), so that the command generator 11 selects an sequence of digital physical quantities corresponding to the desired vibration mode from the vibration effect library 15 as the initial commanding signal in accordance with the selecting command of the input signal, or uses the analogous physical signal derived from the media streaming data in the input signal as the initial commanding signal, and then the command generator 11 sends the digital or analogous initial commanding signal thus generated to the filter 12 in order for filtering processing. The filter 12 sends the commanding signal after filtering processing to the tactile driver 13 which generates a corresponding driving signal based on the filtered commanding signal, wherein the driving signal can be a driving current or a driving voltage. The linear resonant actuator 14 is driven by the driving current or the driving voltage to vibrate so that the smart terminal is forced to vibrate, and thus there occurs a vibration sensation at the part of the user contacting the smart terminal.

Figure 3A:
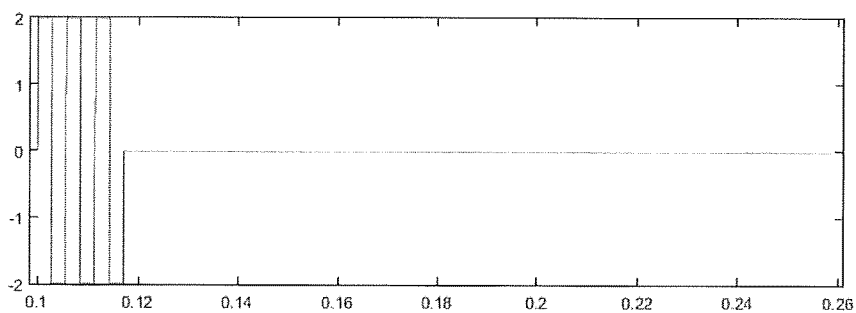
FIG. 3a is a schematic view of the commanding signal without filtering processing provided by Embodiment I of the present disclosure.
Figure 3B:
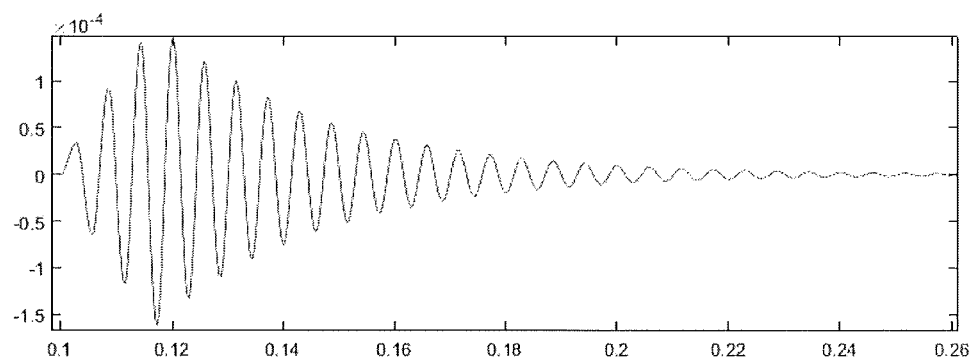
FIG. 3b is a displacement view of the vibrator of the linear resonant actuator without filtering processing provided by Embodiment I of the present disclosure.
Figure 4A:
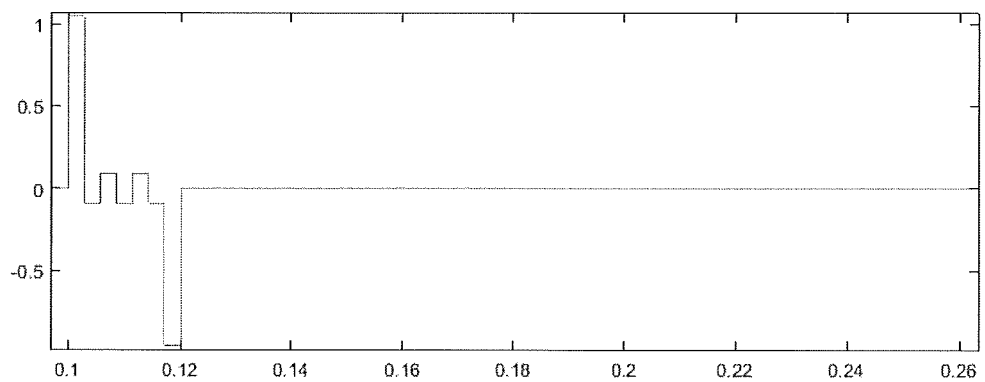
FIG. 4a is a schematic view of the commanding signal after filtering processing provided by Embodiment I of the present disclosure.
Figure 4B:
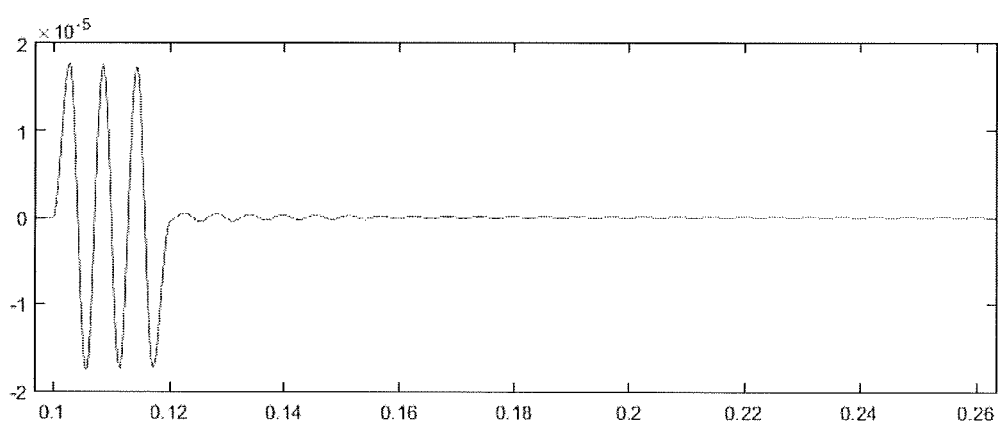
FIG. 4b is a displacement view of the vibrator of the linear resonant actuator after filtering processing provided by Embodiment I of the present disclosure.

FIGS. 3*a* and 3*b* are a schematic view of the commanding signal without filtering processing and a displacement view of the vibrator of the linear resonant actuator respectively, and FIGS. 4*a* and 4*b* are a schematic view of the commanding signal after filtering processing and a displacement view of the vibrator of the linear resonant actuator respectively. It can be seen from FIG. 3*a* that FIG. 3*a* schematically shows a rectangular wave commanding signal with 3 periods and at the starting moment of the fourth period, there is no output commanding signal. The commanding signal shown in FIG. 4*a* is obtained by filtering the commanding signal shown in FIG. 3*a* with the filter according to the present disclosure. It can be seen from FIG. 4*a* that the commanding signal corresponding to the first half period of the first period presents a pulse signal, that is, the amplitudes of the commanding signal corresponding to the first half period of the first period are much larger than the amplitudes of the commanding signal corresponding to the last half period of that period (it can be seen from FIG. 4*a* that the amplitudes of the commanding signal corresponding to the last half period are closed to 0); the commanding signal corresponding to the first half period of the fourth period presents a pulse signal, that is, the amplitudes of the commanding signal corresponding to the first half period of the fourth period are much larger than the amplitudes of the commanding signal corresponding to the last half period (it can be seen from FIG. 4*a* that the amplitudes of the commanding signal corresponding to the last half period are 0), and the phases of the pulse signal reverse by 180°. The corresponding commanding signal in the second and the third periods presents a rectangular wave signal with peaks close to 0.

Comparing FIG. 3*a* with FIG. 4*a*, it can be seen that the commanding signal after filtering processing presents a pulse signal in both the initial and end phases. FIG. 4*a* schematically shows that there is one pulse in both the initial and end phases and the phase of the pulse in the end phase reverses by 180° with the middle phase presenting a periodical signal with peaks close to 0. Thus the driving signal is generated by the commanding signal in FIG. 4*a* so that when the linear resonant actuator is driven to vibrate, the linear resonant actuator can be driven quickly into a stable vibrating status, and quickly stopped from vibrating and can effectively inhibit the residual trailing. It should be noted that FIG. 4a merely schematically shows the situation that there is one pulse in both the initial and end phases. In practice, the present disclosure is not limited to the number of the pulses depending on the number of pulses for desire design.

Comparing FIG. 3b with FIG. 4b, it can be seen that the linear resonant actuator of FIG. 4a has a vibration effect of fast starting and fast braking and can well inhibit the residual trailing. That is, the linear resonant actuator of FIG. 3b slowly enters into a stable vibrating status and creates a long trailing at the end of the vibration, whereas the linear resonant actuator of FIG. 4b can quickly enter into a stable vibrating status and quickly stop vibrating, and creates almost no residual trailing at the end of the vibration. It can be seen that the driving signal generated by the filtered commanding signal has features of overdriving and initiative inhibition, that is, it can drive the linear resonant actuator quickly into a stable vibrating status and effectively inhibit the residual trailing at the end of vibration.

The tactile vibration control system of this embodiment controls the linear resonant actuator by adopting an open-loop control means; by setting a filter in the open-loop control, the filter is used to filter the initial commanding signal generated by the command generator so that when the linear resonant actuator is driven to vibrate by the driving signal generated subsequently there are a quick starting response and a quick braking response. It weakens the overlapping level of the successive vibration events with short gaps on the time dimension, enhances the differentiation between successive vibration events on the time dimension, effects quick starting and quick braking, and thus achieves a desired vibration effect.

Embodiment II

In order to further solve the phenomenon of residual trailing occurring in the linear resonant actuator when the driving signal stops driving, by setting a plurality of sensors that can monitor or sense the vibrating status of the linear resonant actuator, this embodiment uses the sensing signals characterizing the physical quantities related to the vibration mode output by the sensors as feedback signal so as to control the physical quantities of the vibration of the linear resonant actuator in real time. It more robustly estimates the status of the actuator and provides control by effective incorporation so as to further solve the phenomenon of residual trailing occurring when the linear resonant actuator vibrates.

Figure 5:
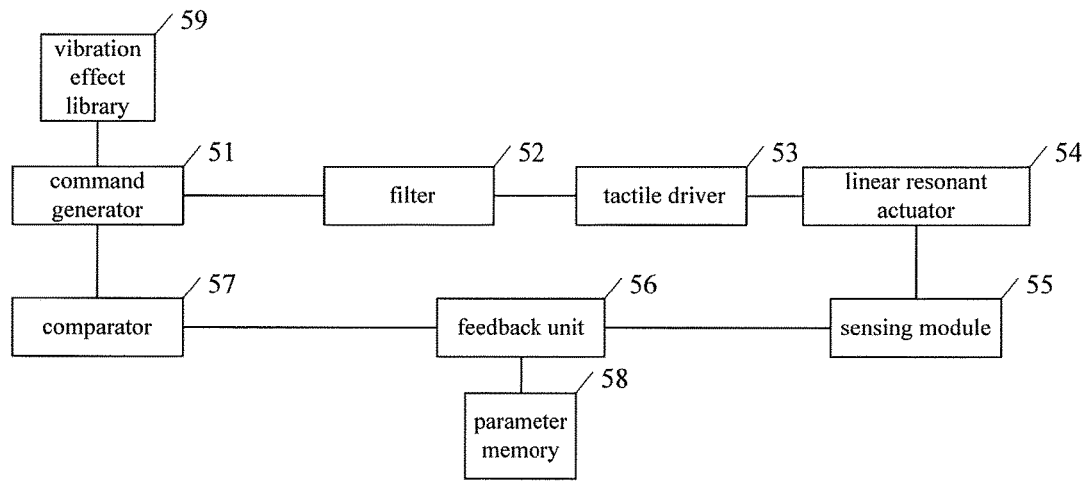
FIG. 5 is a block diagram of a tactile vibration control system for a smart terminal provided by Embodiment II of the present disclosure.

FIG. 5 is a block diagram of a tactile vibration control system for a smart terminal provided by this embodiment. As shown in FIG. 5, by providing a sensing module 55, a feedback unit 56 and a comparator 57 in the tactile vibration control system, the command generator 51, the filter 52, the tactile driver 53, the linear resonant actuator 54, the sensing module 55, the feedback unit 56 and the comparator 57 in FIG. 5 constitute a close-loop-controlled tactile vibration control system.

As shown in FIG. 5, the output of the command generator 51 is connected to the input of the filter 52, the output of the filter 52 is connected to the input of the tactile driver 53, the output of the tactile driver 53 is connected to the input of the linear resonant actuator 54, the output of the linear resonant actuator 54 is connected to the input of the sensing module 55, the output of the sensing module 55 is connected to the output of the feedback unit 56, the output of the feedback unit 56 is connected to the first input of the comparator 57, the second input of the comparator 57 is connected to receive a desired signal (not shown in figure) and the output of the comparator 57 is connected to the input of the command generator 51.

The command generator 51 generates an initial commanding signal according to an input signal, adjusts the generated initial commanding signal according to the error signal generated by the comparator 57 and sends the initial commanding signal to the filter 52. The operations of the filter 52, the tactile driver 53 and the linear resonant actuator 54 in this embodiment can be referred to the relevant description of the filter 12, the tactile driver 13 and the linear resonant actuator 14 in Embodiment I, which will not be repeated.

The sensing module 55 comprises different types of sensors. Each type of the sensors in real time senses a status of the linear resonant actuator 54 and generates a corresponding sensing signal when the sensors sense the vibration of the linear resonant actuator 54.

The sensing module 55 comprises a counter electromotive force sensing circuit which is provided on the linear resonant actuator 54 and generates a counter electromotive force signal when the linear resonant actuator vibrates; and/or, the sensing module 55 comprises a motion sensor which is provided at a position separated from the linear resonant actuator 54 in the smart terminal, wherein the motion sensor generates a corresponding motion sensing signal when the linear resonant actuator vibrates; and/or, the sensing module 55 comprises a motion sensor which is provided on the linear resonant actuator 54, wherein the motion sensor generates a corresponding motion sensing signal when the linear resonant actuator vibrates;

The motion sensors refer to the sensors that can sense important physical quantities of the linear resonant actuator in real time. The motion sensors can be sensors based on piezoelectric, ultrasound, infrared and capacitive components or the like, for example the sensors that can sense the vibration acceleration, vibration speed, vibration displacement or vibration frequency. Preferably, the motion sensors comprise one or more of acceleration sensors, laser Doppler vibrometers, microphones and gyroscopes.

The feedback unit 56 fuses multiple channels of sensing signals generated by the sensing module 55, obtains a feedback signal for estimating the vibration mode of the linear resonant actuator, and sends the feedback signal to the comparator 57.

The comparator 57 compares the feedback signal with a desired signal in the input signal characterizing the vibration mode of the linear resonant actuator, generates an error signal according to a comparison result, and sends the error signal to the command generator 51.

The command generator in this embodiment can provide a PID (proportional integral derivative) control unit to adjust the generated initial commanding signal. Preferably, in every half vibration period of the linear resonant actuator, the initial commanding signal is adjusted according to the error signal, for example the wave parameters such as the amplitude, time duration or period of the corresponding wave of the initial commanding signal are adjusted.

The tactile vibration control system of this embodiment controls the linear resonant actuator by a close-loop control means; by setting different types of sensors that can sense the vibrating status of the linear resonant actuator in the close-loop control, when the linear resonant actuator vibrates, by setting a plurality of sensors that can monitor or sense the vibrating status of the linear resonant actuator, the sensing signals characterizing the physical quantities related to the vibration mode output by the plurality of sensors are used as feedback signal so as to control the physical quantities of the vibration of the linear resonant actuator in real time. It more robustly estimates the status of the actuator and provides control by effective incorporation so as to further solve the phenomenon of residual trailing occurring when the linear resonant actuator vibrates. Meanwhile, this embodiment can achieve a technical effect of adjusting the vibrating status of the linear resonant actuator in real time by feedback and adjustment in real time.

In addition, compared with the processing only adopting the counter electromotive force signal, the technical solution providing different types of sensors of this embodiment can solve the problems that the predicted physical variables related to vibration are unreliable and the feedback adjustment has poor precision when the signal-noise ratio of the counter electromotive force signal is relatively low.

In an implementation of this embodiment, the feedback unit 56 comprises: an acquisition module and a weighing module;

the acquisition module receives multiple channels of sensing signals sent by the sensing module 55, acquires a physical quantity observation value of each channel of the sensing signals, and converts different types of physical quantity observation values into one and same type of physical quantity observation value under one and same reference system;

the weighing module calculates a weighing coefficient of the physical quantity observation value of each channel of the sensing signals, sums the physical quantity observation values of each channel of the sensing signals according to the respective weighing coefficients, obtains a physical quantity estimation value for estimating the vibration mode of the linear resonant actuator, generates a feedback signal according to the physical quantity estimation value and then sends the feedback signal to the comparator 57; and the comparator 57 compares the physical quantity estimation value of said feedback signal with a desired value of the physical quantity in said desired signal and generates an error signal according to a comparison result.

As shown in FIG. 5, the tactile vibration control system also comprises a parameter memory 58 connected to the feedback unit 56, for storing the inherent parameters of the linear resonant actuator derived based on the physical quantity estimation value. Said inherent parameters comprise some performance parameters of the linear resonant actuator that slowly change in long term, such as parameters like internal friction of the linear resonant actuator, resonant frequency related to the spring strength, magnetic flux density or the like. The performance parameters can be duly updated by setting corresponding change thresholds. If the internal friction of the linear resonant actuator derived based on the physical quantity estimation value of the feedback signal, comparing with the current value of the parameter in the parameter memory, satisfies the change threshold, then the parameter in the parameter memory is updated with the internal friction of the linear resonant actuator derived based on the physical quantity estimation value of the feedback signal, so as to understand and manage the performance of the linear resonant actuator.

In order for better explanation of the operations of the acquisition module and weighing module of this embodiment, the generations of the feedback signal and the error signal will now be described in detail by taking the examples of a BEMF (Back Electro-Motive Force) sensing circuit which can output a BEMF signal and an acceleration sensor which can output an acceleration signal.

Due to the fact that the linear resonant actuator can generate BEMF signal during vibration, one can obtain a voltage signal across the two stages of the linear resonant actuator or a current signal flowing through the linear resonant actuator by providing a respective sensing circuit. A desired BEMF signal can be obtained by removing the direct component in the voltage signal or the current signal resulted from the impedance of the linear resonant actuator. The BEMF signal comprises both information on the vibrating status of the linear resonant actuator, such as speed and acceleration, and information on certain physical parameters of the linear resonant actuator itself, such as motor factor.

This embodiment takes the physical quantity of acceleration as an example. Firstly, the acceleration observation value S1 extracted from the BEMF signal is the acceleration of the linear resonant actuator 54's own vibrator because the counter electromotive force sensing circuit is provided on the linear resonant actuator 54. If the acceleration sensor is provided on the linear resonant actuator 54, the acceleration output signal by the acceleration sensor is also the acceleration of the linear resonant actuator 54's own vibrator, and a corresponding acceleration observation value S2 is obtained from the acceleration signal.

Then the weighing coefficients of the two channels of acceleration observation values are calculated. The weighing coefficients can be calculated by signal-noise ratio or variance of the acceleration observation values; when the weighing coefficients calculated by variance, each channel of the acceleration observation values is statistically processed to obtain the variance of each channel of the acceleration observation values, and the sum of the inverses of the variances is calculated, the ratio of the inverse of the variance of each channel of the acceleration observation values and said sum of the inverses of the variances being its weighing coefficient. When calculating the weighing coefficients by the signal-noise ratio, the signal-noise ratio of each channel of the acceleration observation values is calculated and its respective weighing coefficient can be obtained by normalization of the signal-noise ratios of the two channels of acceleration observation values.

Then the acceleration estimation values EV (Estimate Value) for estimating the vibration mode of the linear resonant actuator at individual moments are calculated by means of weighted sum, and $EV(t)=\alpha S1(t)+\beta S2(t)$; wherein $\alpha+\beta=1$, $S1(t)$ is the acceleration observation value extracted from the BEMF signal at moment t, $\alpha$ is the weighing coefficient of $S1(t)$, $S2(t)$ is the acceleration observation value gathered by the acceleration sensor at moment t, and $\beta$ is the weighing coefficient of $S2(t)$.

Lastly, the acceleration estimation values EV are compared with the desired value of the acceleration DV in the input signal at each moments, for example, to generate the error signal Err(t) by the difference of the acceleration estimation value EV(t) at moment t and the desired value of the acceleration DV(t) at moment t, i.e., $Err(t)=EV(t)-DV(t)$.

It should be noted that if the acceleration sensor of this embodiment is provided at a position in the smart terminal separated from the linear resonant actuator 54, then the acceleration output signal by the acceleration sensor is the acceleration of the smart terminal. The acceleration output signal by the acceleration sensor should be converted to the acceleration of the vibrator of the linear resonant actuator 54, and the conversion of the acceleration can be made by the mass ratio of the smart terminal and the vibrator.

It should be further noted that, if the physical quantity observation values extracted from the BEMF signal of this embodiment are speed observation values, two different types of physical quantity observation values should be converted to one and same type of physical quantity observation value. For example, a speed observation value extracted from the BEMF signal is converted to an acceleration observation value, or an acceleration observation value output by the acceleration sensor is converted to a speed observation value.

In another implementation of this embodiment, a filter is also provided in the above tactile vibration control system. The design of the filter can be referred to the relevant description in Embodiment I.

Figure 6:
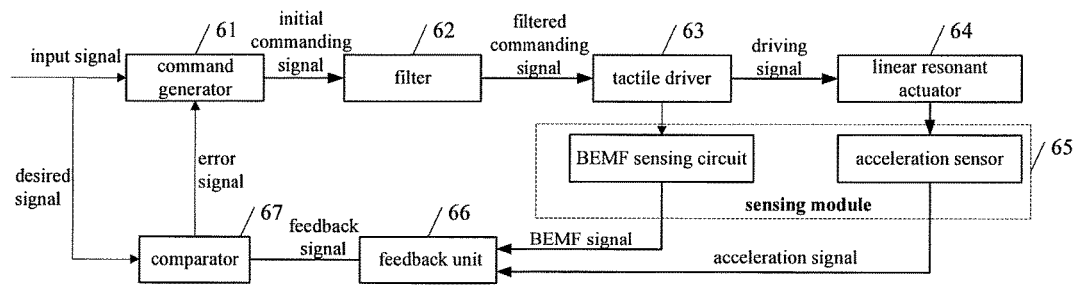
FIG. 6 shows a schematic view of the operation of a close-loop tactile vibration control system.

As shown in FIG. 6, FIG. 6 shows a schematic view of the operation of a close-loop tactile vibration control system. The filter 62 in FIG. 6 constitutes part of the close-loop tactile vibration control system and is connected between the command generator 61 and the tactile controller 63 in order to filter the initial commanding signal so that the commanding signal after being filtered has an overdriving feature in the initial time period and an initiative braking feature in the ending time period.

Figure 7:
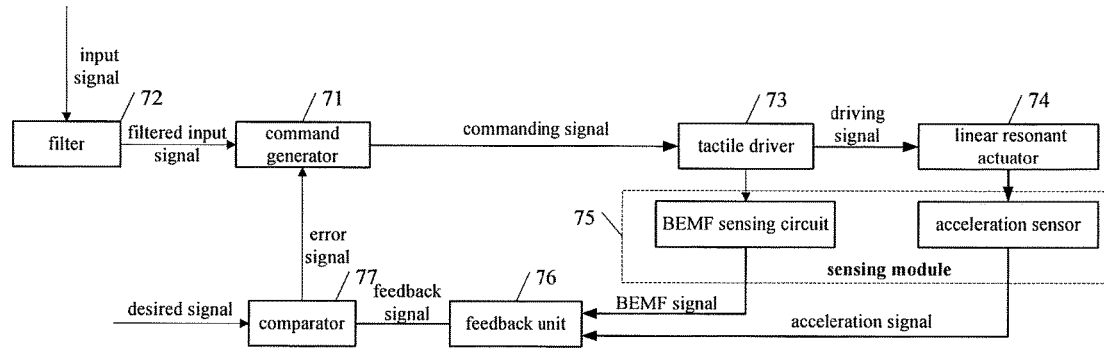
FIG. 7 shows a schematic view of the operation of another close-loop tactile vibration control system.

As shown in FIG. 7, FIG. 7 shows another schematic view of the operation of a close-loop tactile vibration control system. The output port of the filter 72 in FIG. 7 is connected to the input port of the command generator 71 in order to filter the input signal and sends the input signal after being filtered to the command generator 71 so that the commanding signal generated by the command generator 71 has an overdriving feature in the initial time period and an initiative braking feature in the ending time period.

It should be noted that the operations of the tactile controllers 63, 73, the linear resonant actuators 64, 74, the sensing modules 65, 75, the feedback units 66, 76, and the comparators 67, 77 in FIGS. 6 and 7 can be referred to the relevant description of this embodiment, which will not be repeated.

Referring to FIGS. 6 and 7, the operation of the tactile vibration control system is as follows: the smart terminal comprises a sensing module of different types of sensors (FIGS. 6 and 7 schematically show the sensing module comprising the BEMF sensing circuit and the acceleration sensor) which sense the status of the linear resonant actuator in real time. When the linear resonant actuator vibrates, the sensing module sends the sensing signal sensed by each type of the sensors to the feedback unit for fusion of the sensing signals, and a feedback signal for estimating the vibration mode of the linear resonant actuator is obtained. The comparator generates a corresponding error signal by comparing the feedback signal with a desired signal, so that the command controller adjusts the generated initial commanding signal according to the error signal.

Embodiment III

Based on the technical concept the same as the Embodiments I and II, this embodiment provides a tactile vibration control method for a smart terminal.

Figure 8:
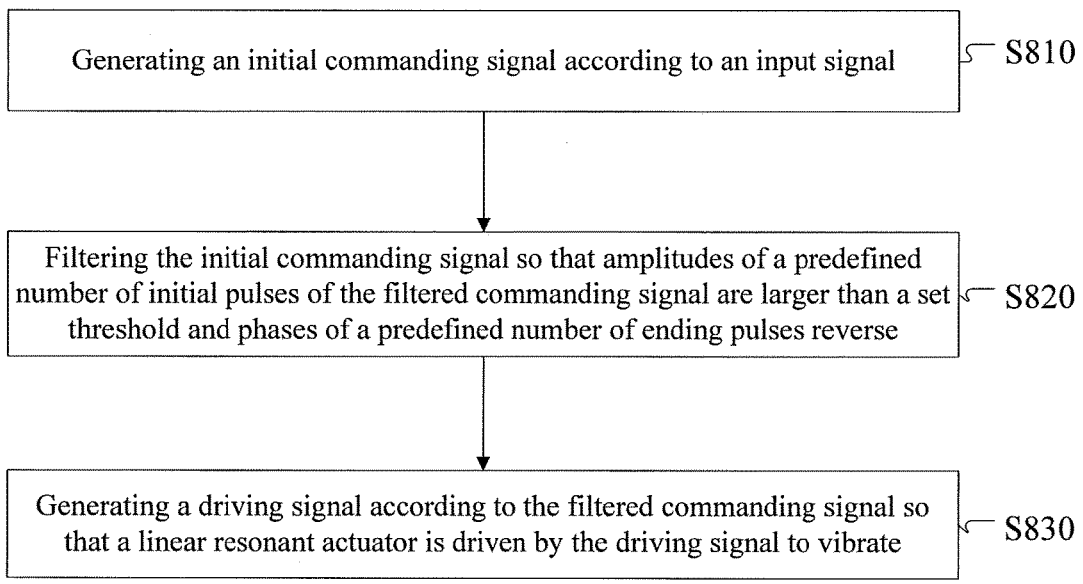
FIG. 8 is a flow diagram of a tactile vibration control method for a smart terminal provided by Embodiment III of the present disclosure.

As shown in FIG. 8, FIG. 8 is a tactile vibration control method for a smart terminal provided by this embodiment, said control method comprising:

S810, generating an initial commanding signal according to an input signal.

In this step, said generating an initial commanding signal according to an input signal is particularly:

reading a vibration mode list in a vibration effect library, and selecting a sequence of physical quantities corresponding to a desired vibration mode and characterizing vibration effect from the vibration mode list according to a selecting command in the input signal, the sequence of physical quantities being used as the initial commanding signal; or acquiring from media streaming data in the input signal a physical signal characterizing vibration effect derived from the media streaming data, the physical signal being used as the initial commanding signal.

S820, filtering the initial commanding signal so that amplitudes of a predetermined number of initial pulses of the filtered commanding signal are larger than a set threshold and phases of a predetermined number of ending pulses reverse.

In this step, said filtering the initial commanding signal is particularly:

setting a time domain signal of the filter as an impulse signal;

calculating a damped resonant period of the linear resonant actuator by a resonant frequency and a damping ratio of the linear resonant actuator, and then determining an impulse moment of each impulse of the filter by the damped resonant period; and calculating an impulse amplitude of each impulse by the damping ratio of the linear resonant actuator.

S830, generating a driving signal according to the filtered commanding signal so that a linear resonant actuator is driven by the driving signal to vibrate.

The detailed implementation of each step in the embodiment of the method of the present disclosure can be referred to the description of the tactile vibration control system of the Embodiment I of the present disclosure, which will not be repeated.

In a preferable embodiment of this embodiment, in order to further solve the phenomenon of residual trailing occurring in the linear resonant actuator when the driving signal stops driving, by monitoring or sensing the vibration mode of the linear resonant actuator, the preferable embodiment of this embodiment uses the obtained sensing signals characterizing the physical quantities related to the vibration mode as the feedback signal so as to control the physical quantities of the vibration of the linear resonant actuator in real time. It more robustly estimates the status of the actuator and provides control by effective incorporation so as to further solve the phenomenon of residual trailing occurring when the linear resonant actuator vibrates.

Figure 9:
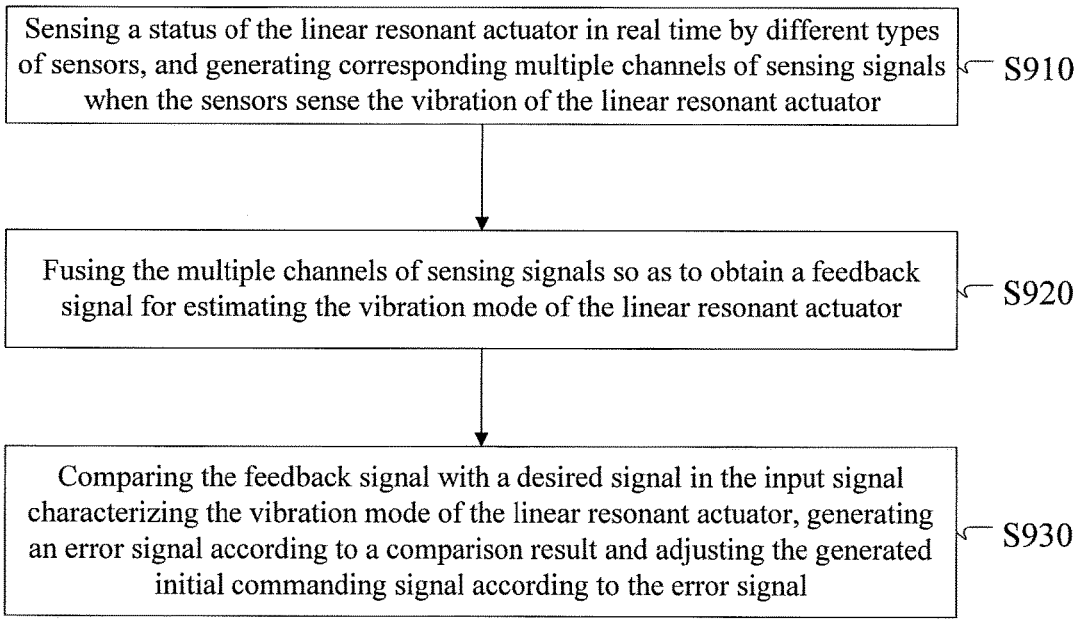
FIG. 9 is a flow diagram of the close-loop tactile vibration control method for a smart terminal provided by Embodiment III of the present disclosure.

Specifically, as show in FIG. 9, the method also comprises:

S910, sensing a status of the linear resonant actuator in real time by different types of sensors, and generating corresponding multiple channels of sensing signals when the sensors sense the vibration of the linear resonant actuator.

In practice, the vibrating status of the linear resonant actuator can be sensed by sensors such as motion sensors and a counter electromotive force sensing circuit.

For example, this embodiment can provide a counter electromotive force sensing circuit on the linear resonant actuator, wherein the counter electromotive force sensing circuit generates a counter electromotive force signal when the linear resonant actuator vibrates; this embodiment can also provide a motion sensor at a position separated from the linear resonant actuator in the smart terminal, wherein the motion sensor generates a corresponding motion sensing signal when said linear resonant actuator vibrates; and of course, this embodiment can also provide a motion sensor on the linear resonant actuator, wherein said motion sensor generates a corresponding motion sensing signal when the linear resonant actuator vibrates; wherein, said motion sensors at least comprise one or more of acceleration sensors, laser Doppler vibrometers, microphones and gyroscopes.

S920, fusing the multiple channels of sensing signals so as to obtain a feedback signal for estimating the vibration mode of the linear resonant actuator;

S930, comparing the feedback signal with a desired signal in the input signal characterizing the vibration mode of the linear resonant actuator, generating an error signal according to a comparison result and adjusting the generated initial commanding signal according to the error signal.

In this preferable embodiment, the fusing the multiple channels of sensing signals so as to obtain a feedback signal for estimating the vibration mode of the linear resonant actuator in step S920 is particularly:

acquiring a physical quantity observation value of each channel of the sensing signals, and converting different types of physical quantity observation values into one and same type of physical quantity observation value under one and same reference system; and calculating a weighing coefficient of the physical quantity observation value of each channel of the sensing signals, summing the physical quantity observation values of each channel of the sensing signals according to the respective weighing coefficients, obtaining a physical quantity estimation value for estimating the vibration mode of the linear resonant actuator, generating a feedback signal according to the physical quantity estimation value and then sending the feedback signal to said comparator;

The comparing the feedback signal with a desired signal in the input signal characterizing the vibration mode of the linear resonant actuator in step 5930 is particularly: comparing the physical quantity estimation value of the feedback signal with a desired value of the physical quantity in a desired signal and generating an error signal according to a comparison result.

It should be noted that in practice the method in FIG. 9 can also comprise:

providing a parameter memory, said parameter memory storing inherent parameters of the linear resonant actuator derived based on physical variable estimation values of said feedback signal in step S920.

The detailed implementation of each step in the embodiment of the method of the present disclosure can be referred to the description of the tactile vibration control system of the Embodiment II of the present disclosure, which will not be repeated.

In summary, with respect to the phenomenon of residual trailing occurring in the linear resonant actuator when the driving signal stops driving, the present disclosure controls the linear resonant actuator by adopting an open-loop control means; by setting a filter in the open-loop control, the filter is used to filter the initial commanding signal generated by the command generator so that when the linear resonant actuator is driven to vibrate by the driving signal generated subsequently there are a quick starting response and a quick braking response. It weakens the overlapping level of the successive vibration events with short gaps on the time dimension, enhances the differentiation between successive vibration events on the time dimension, effects quick starting and quick braking, and thus achieves a desired vibration effect. In preferable embodiments, by setting a plurality of sensors that can monitor or sense the vibrating status of the linear resonant actuator, a feedback unit that fuses the sensing signals characterizing the physical quantities related to the vibration mode output by the plurality of sensors into a feedback signal, and a comparator that generates an error signal based on the feedback signal and a desired signal in the input signal, the present disclosure controls the physical quantities of the vibration of the linear resonant actuator in real time. It more robustly estimates the status of the linear resonant actuator and provides control by effective incorporation so as to further solve the phenomenon of residual trailing occurring when the linear resonant actuator vibrates. Meanwhile, the solution can achieve a technical effect of adjusting the vibrating status of the actuator in real time by feedback and adjustment in real time.

The above described are merely preferable embodiments of the present disclosure and are not intended to limit the protection scope of the present disclosure. Any modification, equivalent alternation and development made within the scope and principle of the present disclosure fall within the protection scope of the present disclosure.

The invention claimed is:

1. A tactile vibration control system for a smart terminal, comprises: a command generator, a filter, a tactile driver and a linear resonant actuator;

the command generator generates an initial commanding signal according to an input signal and sends the initial commanding signal to the filter;

the filter filters the received initial commanding signal and sends the filtered commanding signal to the tactile driver; amplitudes of a predetermined number of initial pulses of the filtered commanding signal are larger than a set threshold and phases of a predetermined number of ending pulses reverse;

the tactile driver generates a driving signal according to the received filtered commanding signal, the driving signal has an overdriving feature in an initial time period and has an initiative braking feature in an ending time period, and sends the generated driving signal to the linear resonant actuator; and the linear resonant actuator receives the driving signal and is driven by the driving signal to vibrate.

2. The tactile vibration control system according to claim 1, wherein the command generator reads a vibration mode list in a vibration effect library, and selects a sequence of physical quantities corresponding to a desired vibration mode and characterizing vibration effect from the vibration mode list according to a selecting command in the input signal, the sequence of physical quantities being used as the initial commanding signal; or the command generator acquires from media streaming data in the input signal a physical signal characterizing vibration effect derived from the media streaming data, the physical signal being used as the initial commanding signal.

3. The tactile vibration control system according to claim 1, wherein a time domain signal of the filter is an impulse signal, and the filter is set by the following method:

calculating a damped resonant period of the linear resonant actuator by a resonant frequency and a damping ratio of the linear resonant actuator, and then determining an impulse moment of each impulse of the filter by the damped resonant period; and calculating an impulse amplitude of each impulse by the damping ratio of the linear resonant actuator.

4. The tactile vibration control system according to claim 3, wherein the impulse signal comprises two impulses, and the impulse moment and impulse amplitude of each impulse are calculated by the following formula:

$$\begin{cases} t_1 = 0, A_1 = \dfrac{1}{1+e^{\frac{-\zeta\pi}{\sqrt{1-\zeta^2}}}} \\ t_2 = \sigma g \dfrac{1}{\sqrt{1-\zeta^2}\, f_n}, A_2 = 1 - A_1 \end{cases};$$

wherein $t_1$ and $t_2$ are the impulse moments of the first impulse and the second impulse respectively, $A_1$ and $A_2$ are the impulse amplitudes of the first impulse and the second impulse respectively, $f_n$ is the resonant frequency of the linear resonant actuator, $\zeta$ is the damping ratio of the linear resonant actuator, and $\sigma$ is a constant larger than 0 and smaller than 1.

5. The tactile vibration control system according to claim 1, wherein the tactile vibration control system also comprises: a sensing module, a feedback unit and a comparator;

the sensing module comprises different types of sensors in which each type of the sensors in real time senses a status of the linear resonant actuator and generates a corresponding sensing signal when the sensors sense the vibration of the linear resonant actuator;

the feedback unit fuses multiple channels of sensing signals generated by the sensing module, obtains a feedback signal for estimating a vibration mode of the linear resonant actuator, and sends the feedback signal to the comparator;

the comparator compares the feedback signal with a desired signal in the input signal characterizing the vibration mode of the linear resonant actuator, generates an error signal according to a comparison result, and sends the error signal to the command generator; and the command generator receives the error signal and adjusts the generated initial commanding signal according to the error signal.

6. The tactile vibration control system according to claim 5, wherein the feedback unit comprises: an acquisition module and a weighing module;

the acquisition module receives multiple channels of sensing signals sent by the sensing module, acquires a physical quantity observation value of each channel of the sensing signals, and converts different types of physical quantity observation values into one and same type of physical quantity observation value under one and same reference system;

the weighing module calculates a weighing coefficient of the physical quantity observation value of each channel of the sensing signals, sums the physical quantity observation value of each channel of the sensing signals according to the respective weighing coefficient, obtains a physical quantity estimation value for estimating the vibration mode of the linear resonant actuator, generates a feedback signal according to the physical quantity estimation value and then sends the feedback signal to the comparator; and the comparator compares the physical quantity estimation value of the feedback signal with a desired value of the physical quantity in the desired signal and generates an error signal according to a comparison result.

7. The tactile vibration control system according to claim 5, wherein the sensing module comprises a counter electromotive force sensing circuit which is provided on the linear resonant actuator and generates a counter electromotive force signal when the linear resonant actuator vibrates; and/or, the sensing module comprises a motion sensor which is provided at a position separated from the linear resonant actuator in the smart terminal and generates a corresponding motion sensing signal when the linear resonant actuator vibrates; and/or, the sensing module comprises a motion sensor which is provided on the linear resonant actuator and generates a corresponding motion sensing signal when the linear resonant actuator vibrates;

the motion sensors at least comprise one or more of acceleration sensors, laser Doppler vibrometers, microphones and gyroscopes.

8. The tactile vibration control system according to claim 5, wherein the tactile vibration control system also comprises a parameter memory; and the parameter memory stores inherent parameters of the linear resonant actuator derived based on physical variable estimation values of the feedback signal.

9. A tactile vibration control method for a smart terminal, comprises:

generating an initial commanding signal according to an input signal;

filtering the initial commanding signal so that amplitudes of a predetermined number of initial pulses of the filtered commanding signal are larger than a set threshold and phases of a predetermined number of ending pulses reverse; and generating a driving signal according to the filtered commanding signal, the driving signal has an overdriving feature in an initial time period and has an initiative braking feature in an ending time period, so that a linear resonant actuator is driven by the driving signal to vibrate.

10. The tactile vibration control method according to claim 9, wherein the generating an initial commanding signal according to an input signal is particularly:

reading a vibration mode list in a vibration effect library, and selecting a sequence of physical quantities corresponding to a desired vibration mode and characterizing vibration effect from the vibration mode list according to a selecting command in the input signal, the sequence of physical quantities being used as the initial commanding signal; or acquiring from media streaming data in the input signal a physical signal characterizing vibration effect derived from the media streaming data, the physical signal being used as the initial commanding signal.

11. The tactile vibration control method according to claim 9, wherein the filtering the initial commanding signal so that amplitudes of a predetermined number of initial pulses of the filtered commanding signal are larger than a set threshold and phases of a predetermined number of ending pulses reverse comprises:

setting a time domain signal of the filter as an impulse signal; and calculating a damped resonant period of the linear resonant actuator by a resonant frequency and a damping ratio of the linear resonant actuator, and then determining an impulse moment of each impulse of the filter by the damped resonant period; and calculating an impulse amplitude of each impulse by the damping ratio of the linear resonant actuator.

12. The tactile vibration control method according to claim 9, wherein the method also comprises:

sensing a status of the linear resonant actuator in real time by different types of sensors, and generating corresponding multiple channels of sensing signals when the sensors sense the vibration of the linear resonant actuator;

fusing the multiple channels of sensing signals so as to obtain a feedback signal for estimating the vibration mode of the linear resonant actuator;

comparing the feedback signal with a desired signal in the input signal characterizing the vibration mode of the linear resonant actuator, and generating an error signal according to a comparison result; and adjusting the generated initial commanding signal according to the error signal.

13. The tactile vibration control method according to claim 12, wherein the fusing the multiple channels of sensing signals so as to obtain a feedback signal for estimating the vibration mode of the linear resonant actuator comprises:

acquiring a physical quantity observation value of each channel of the sensing signals, and converting different types of physical quantity observation values into one and same type of physical quantity observation value under one and same reference system; and calculating a weighing coefficient of the physical quantity observation value of each channel of the sensing signals, summing the physical quantity observation values of each channel of the sensing signals according to the respective weighing coefficients, obtaining a physical quantity estimation value for estimating the vibration mode of the linear resonant actuator, and generating a feedback signal according to the physical quantity estimation value; and the comparing the feedback signal with a desired signal in the input signal characterizing the vibration mode of the linear resonant actuator, and generating an error signal according to a comparison result is particularly:

comparing the physical quantity estimation value of the feedback signal with a desired value of the physical quantity in the desired signal and generating an error signal according to a comparison result.

14. The tactile vibration control method according to claim 12, wherein the sensing a status of the linear resonant actuator in real time by different types of sensors, and generating corresponding multiple channels of sensing signals when the sensors sense the vibration of the linear resonant actuator comprises:

providing a counter electromotive force sensing circuit on the linear resonant actuator, wherein the counter electromotive force sensing circuit generates a counter electromotive force signal when the linear resonant actuator vibrates; and/or, providing a motion sensor at a position separated from the linear resonant actuator in the smart terminal, wherein the motion sensor generates a corresponding motion sensing signal when the linear resonant actuator vibrates; and/or, providing a motion sensor on the linear resonant actuator, wherein the motion sensor generates a corresponding motion sensing signal when the linear resonant actuator vibrates; wherein, the motion sensors at least comprise one or more of acceleration sensors, laser Doppler vibrometers, microphones and gyroscopes.

15. The tactile vibration control method according to claim 12, wherein the method also comprises:

providing a parameter memory, the parameter memory storing inherent parameters of the linear resonant actuator derived based on physical variable estimation values of the feedback signal.

* * * * *